United States Patent [19]
Davis

[11] Patent Number: 6,064,739
[45] Date of Patent: May 16, 2000

[54] SYSTEM AND METHOD FOR COPY-PROTECTING DISTRIBUTED VIDEO CONTENT

[75] Inventor: Derek L. Davis, Phoenix, Ariz.

[73] Assignee: Intel Corporation, Santa Clara, Calif.

[21] Appl. No.: 09/134,583

[22] Filed: Aug. 14, 1998

Related U.S. Application Data

[62] Division of application No. 08/723,830, Sep. 30, 1996, Pat. No. 5,825,879.

[51] Int. Cl.[7] .............................. H04L 9/00; H04N 7/167
[52] U.S. Cl. ........................... 380/200; 380/216; 380/52; 348/714
[58] Field of Search .................................. 380/5, 10, 20, 380/52, 3, 4, 49, 21, 23, 25; 348/714, 715; 463/31

[56] References Cited

U.S. PATENT DOCUMENTS

| | | | |
|---|---|---|---|
| 4,433,207 | 2/1984 | Best | 380/4 |
| 5,046,092 | 9/1991 | Walker et al. | 380/20 |
| 5,132,992 | 7/1992 | Yurt et al. | 375/122 |
| 5,133,079 | 7/1992 | Ballantyne et al. | 455/4.1 |
| 5,138,659 | 8/1992 | Kelkar et al. | 380/20 |
| 5,327,156 | 7/1994 | Masukane et al. | 345/113 |
| 5,497,419 | 3/1996 | Hill | 380/9 |
| 5,671,276 | 9/1997 | Eyer et al. | 380/4 |
| 5,694,332 | 12/1997 | Maturi | 360/40 X |

*Primary Examiner*—Pinchus M. Laufer
*Attorney, Agent, or Firm*—Blakely, Sokoloff, Taylor & Zafman LLP

[57] ABSTRACT

A secure video content processor ("SVCP") which receives encrypted digital video information and converts it into analog information for a monitor while preventing unauthorized access to the intermediate unencrypted digital data. The SVCP uses hardware envelopes to prevent unauthorized access to the decrypted digital stream. When a need arises to transmit digital data outside the hardware envelope, the digital data is encrypted and then decrypted when it re-enters a hardware protected section of circuitry.

20 Claims, 6 Drawing Sheets

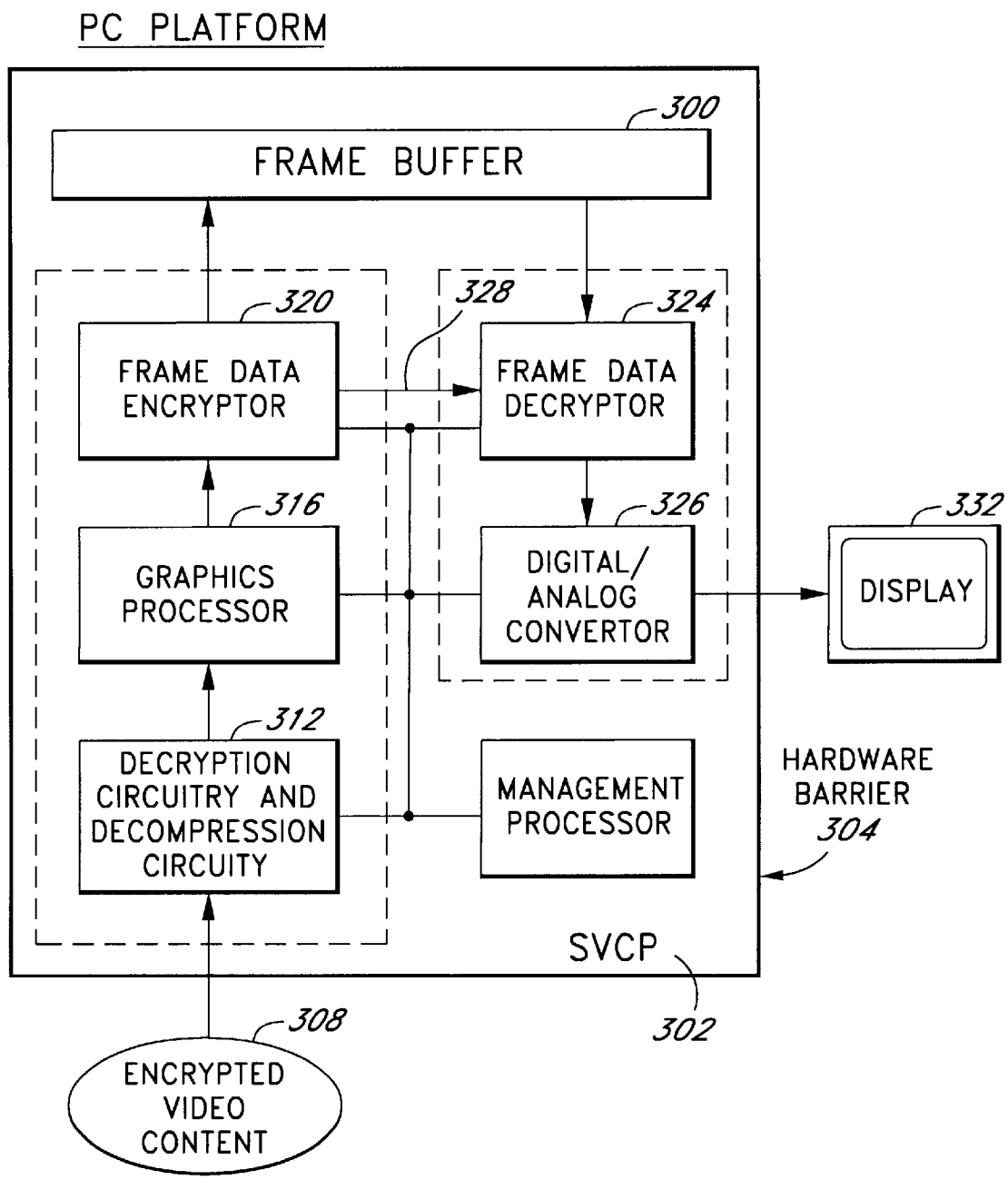

SYSTEM AND METHOD FOR COPY-PROTECTING DISTRIBUTED VIDEO CONTENT

CROSS-REFERENCES TO RELATED APPLICATIONS

This is a divisional of a U.S. Ser.. No. 08/723,830 now U.S. Pat. No. 5,825,879 filed Sep. 30, 1996 issued to Davis. This application is owned by the same assignee of the present Application.

BACKGROUND OF THE INVENTION

1. Field of the Invention

The present invention relates generally to protecting digital graphical information from being copied. More particularly, the present invention relates to protecting digital data using a combination of cryptographic techniques and physical encapsulation of digital data from the time it is submitted for processing until the time it is provided to the monitor in an analog form.

2. Description of Related Art

As a result of popular acceptance of the Internet and other mechanisms used to compress, store and/or distribute digital video information, multipurpose platforms such as personal computers ("PCs") have become viable platforms for viewing and retrieving digital video information. Prior to the popular acceptance of video on multipurpose platforms, video content was usually viewed on consumer electronic devices dedicated to retrieving and displaying such information. Despite the rising popularity of multipurpose platforms, video content providers have been reluctant to provide substantial content for the PC platform.

One reason for this reluctance involves the ease in which digital representations of video content can be illicitly copied and resold with no degradation of quality. Without a system to protect digital data on a PC, the risk of fraudulent use and devaluation of their digital content is too great.

Under conventional techniques, digital video sources usually transmit digital video content to the PC in bulk-encrypted form. The content is received either electronically (via Internet) or from a physical medium (e.g. Digital Versatile Disk ("DVD"). Before an authorized user can view the video content, it must first be decrypted. The decrypted data is in a compressed format (e.g. Motion Picture Experts Group ("MPEG")). The decrypted data is decompressed prior to being processed by a graphics controller. Thereafter, the decompressed processed data is loaded into a frame buffer for later retrieval and use by a display device.

Frame buffers store information until needed by a display device. Different processes involved in generating a digital data frame and creating an image from the digital data frame often results in timing differences which necessitates a frame buffer memory. The frame buffer memory, usually a large block of memory, stores the intermediate images until the display device can process them. Different device fabrication techniques make it desirable to fabricate large blocks of memory separately from processing components used in decompressing and decoding video signals.

Image display electronics retrieve the images from the frame buffer and convert the digital representation of a frame into an analog signal, usually using a digital/analog ("D/A") converter as each frame is needed by the display device. The analog information is sent to the display device (often a monitor) which produces an image for viewing or recording.

The graphics control electronics may further include support circuits which track or "meter" the amount and/or purpose of processed information, maintain billing records, and communicate with a transaction clearing house.

The many processing stages used in converting the bulk encrypted digital video content into a display device useful format provides many opportunities for an unauthorized copier to insert electronics which captures the original unencrypted digital original. Prior art, software-only mechanisms for managing the decrypting, metering, billing operations, and image display do not provide sufficient protection of the digital content. Unauthorized users can "hack" such software to obtain the original unencrypted digital "master". Thus, a need exists for providing a secure method of retrieving and distributing such video content.

SUMMARY OF THE INVENTION

The present invention relates to a secure video content processor. The secure video content processor comprises (1) a first cryptographic unit, (2) a frame buffer, and (3) a second cryptographic unit. The first cryptographic unit is used to decrypt incoming encrypted video information and to produce encrypted image frames based on the video information. Coupled to the first cryptographic unit, the frame buffer receives the encrypted image frames from the first cryptographic unit and stores the encrypted image frames until needed by the second cryptographic unit. The second cryptographic unit retrieves the encrypted image frames stored in the frame buffer, decrypts the encrypted image frames, and converts the decrypted image frames into an analog signal.

BRIEF DESCRIPTION OF THE DRAWINGS

The advantages of the present invention will become more readily apparent to those ordinarily skilled in the art after reviewing the following detailed description and accompanying drawings, wherein:

FIG. 3B is a block diagram of a third embodiment of the secure video contest processor having an internal frame buffer.

DESCRIPTION OF THE PREFERRED EMBODIMENT

Figure 1:
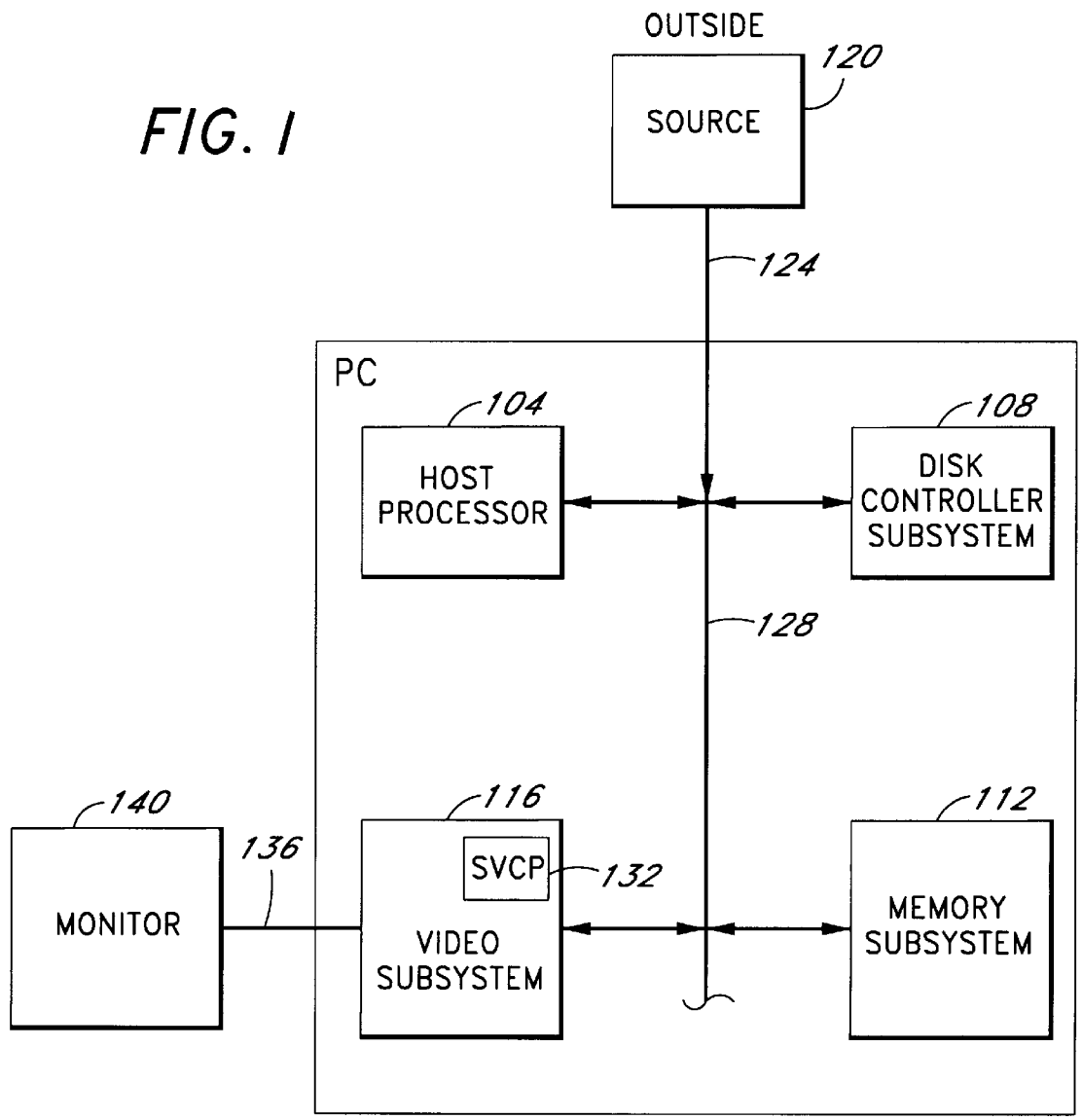
FIG. 1 is a block diagram of a Secure Video Content Processor ("SVCP") system as used in a host personal computer.

The present invention relates to a Secure Video Content Processor ("SVCP") which uses a hardware-based security "envelope" that encapsulates encrypted digital data from the time it is submitted to a computer for decryption and processing until the time it is provided to a display device, often in an analog form. The electronics encased by the hardware envelope decodes and decompresses incoming digital video data. The signal is then converted to analog form before exiting the hardware barrier for use by a display device. In other embodiments of the invention where data is output from the hardware "envelope" in digital form, the data is encoded before exiting the envelope and then decoded when the data returns to the hardware envelope. By protecting the data over the entire processing flow, an unauthorized copier will find it more difficult to "capture" the unencrypted digital representation.

In the following description, some terminology is used to discuss certain well-known cryptographic function. For example, a "key" is an encoding and/or decoding parameter used by conventional cryptographic algorithms such as Rivest, Shamir and Adleman ("RSA"), Data Encryption Algorithm ("DEA") as specified in Data Encryption Standard ("DES") and the like. A "certificate" is defined as any digital information (typically a public key) associated with an entity, encrypted by a private key held by another entity such as a manufacturer or a trusted authority (e.g., bank, governmental entity, trade association, etc.) having a widely published public key. The term "secure" indicates that it is practically difficult for an unwanted copier to access sensitive unencoded data or otherwise perpetrate fraud on a system.

Besides protecting the integrity of the digital video data described above, it may be necessary to gain prior authorization before viewing of a particular video. Authorization can be obtained under a public/private key cryptographic scheme although a symmetric key cryptographic scheme may be employed. One scheme involves a user providing a digital certificate of the SVCP to a provider of video services. The provider may be an internet provider, an on-line service provider, a cable company, a local store, or a video rental agency. The digital certificate, including a public key of the SVCP encrypted with the private key(s) from one or more trusted authorities, identifies the SVCP that will be used to decode the video content from the provider.

In exchange for payment, or some other mutually agreed upon arrangement, the provider transfers a cryptographic key either to the SVCP directly through a connecting cable (e.g. telephone lines, cable, etc.) or to the user who subsequently loads the cryptographic key into the SVCP. The cryptographic key is needed for decoding the video to be viewed. The cryptographic key may be encrypted with the public key of the SVCP to ensure its security. Along with the needed cryptographic key, other authorization information may also be transferred. Such information may include, but is not limited to, the number of times a video may be watched or an expiration time upon which the video may no longer be watched. Thus, the encrypted video itself is useless without the cryptographic key, allowing the encrypted video to be provided by the provider or by other general distribution sources such as the internet.

In one embodiment of a system supporting the Secure Video Content Processor ("SVCP"), the SVCP is mounted on a Peripheral Component Interconnect ("PCI") card for insertion into a PCI slot inside a personal computer. The PCI slot connects the SVCP to a PCI bus. These cards traditionally included a number of electronic components which process an incoming data stream into the graphics used by a display device. Since prior art systems are not secure, users are able to add electronics to a card or use software to gain unauthorized access to the decrypted digital data stream.

FIG. 1 is a schematic diagram of a PC 100 including a host processor 104, a disk controller subsystem 108, a memory subsystem 112 and a video subsystem 116. An outside source 120, which may be an Internet source, a laser disk, a digital video disk, a DVD, or another external source provides an encrypted digital data stream along a connecting cable 124 to the PC 100. Interconnecting buses 128, such as PCI buses, transfer data among the various PC 100 elements.

A secure video content processor ("SVCP") 132 is included within the video subsystem 116. The SVCP processes graphic data before the data is output from PC 100, via a cable 136 to a monitor 140. Host processor 104 manages operation of the PC 100. The host processor 104 may be a state machine, a general processor, a microcontroller, or a microprocessor such as an Intel® Microprocessor Architecture (e.g. Intel® Pentium™ processor).

While processing data, the SVCP 132 may require a frame buffer for temporary storage of digital image frames or other information. The memory for the temporary storage may be located in the SVCP 132 itself. Alternately, the SVCP 132 may store the digital image frames within the memory subsystem 112 located outside the SVCP 132. Such memory may be located on a computer card containing circuitry associated with the SVCP 132, or the memory may be located elsewhere in the computer. Usually, if the temporary storage memory is located elsewhere in the computer, the temporary storage memory will be connected to the SVCP via a bus.

After processing the data, the SVCP 132 converts the data to an analog signal and transmits the analog signal to a monitor or display device 140. Adjustments to the video subsystem 116 may be made to ensure compatibility with the SVCP 132 contained within the PC 100.

Figure 2:
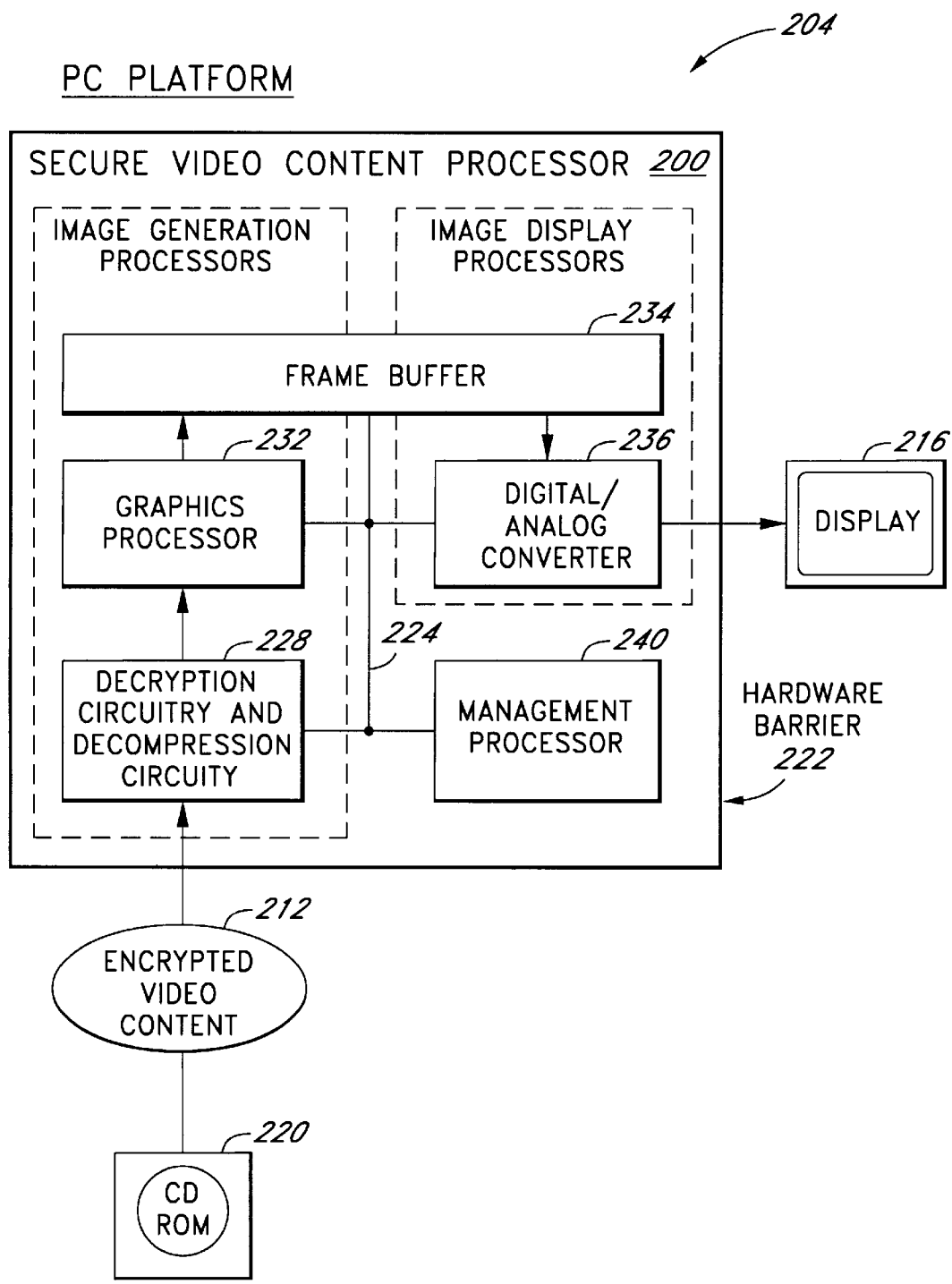
FIG. 2 is a block diagram showing a first embodiment of a secure video content processor and its use with a display device.

FIG. 2 is a first embodiment of the SVCP 200 shown in FIG. 1 as SVCP 132. The SVCP is usually included within a video subsystem 116 implemented inside a PC 100, usually on a PCI bus compatible card much like a traditional graphics controller card. The SVCP 200 takes the encrypted digital video content 120 and converts it into a form suitable for a display device 140. The encrypted video content may be sourced from a number of different sources, such as a DVD, a CD ROM 220, or a transceiver device (e.g., a modem) which receives signals from on-line services or the Internet.

The outer wall or security boundary 222 of the SVCP 200 is a hardware barrier which deters tampering with the electronics of the SVCP 200. This hardware barrier 222 may merely resist opening without significant force or the barrier may destroy the interior circuitry if the outer case is opened. Two methods of implementing such a system are described in co-pending United States patent applications entitled "Secure Semiconductor Device" (Application Ser. No. 08/575,295) and "A Method To Prevent Intrusions Into Electronic Circuitry" (Application Ser. No. 08/412,159). Both applications are assigned to Assignee of the subject application. Alternatively, the hardware barrier 222 may exist because the various components are integrated on a single chip making it physically difficult to tap into the microscopic wires on the chip. A typical hardware barrier 222 is an integrated circuit package often made of ceramic or plastic material.

The SVCP 200 receives the encrypted video content 212 which maybe in the form of an encrypted data stream. The data stream may have been compressed using a variety of different formats including a MPEG or Joint Photograph Experts Group ("JPEG") compressed format. Both JPEG and MPEG are well known standards used to compress and transmit still and moving digital images respectively.

Image generation electronics, including decryption and decompression circuitry 228 and a graphics processor 232, prepares the incoming data for storage in a frame buffer 234.

The decryption circuitry and decompression circuitry 228 within the SVCP 200 decrypts and if necessary decompresses the data stream. The graphics processor 232 then processes the decrypted data stream to generate a digital representation of an image. A digital representation of the image is stored in a frame buffer 234 until needed by the display device 216. As an image is needed, image display electronics in the SVCP 200 retrieves the data from the frame buffer 234 and converts it to analog form. The image display electronics may include a D/A converter 236 or other appropriate means to convert the digital information into an analog signal. The SVCP 200 transmits the analog signal to display device 16.

Control lines 224 couple a management processor 240 to the SVCP electronics such as the frame buffer 234, graphics processor 232 and decryption circuitry and decompression circuitry 228. It is contemplated that the management processor 240 may be any processor, state machine or microcontroller which manages or coordinates the operation of the SVCP 200.

Figure 3A:
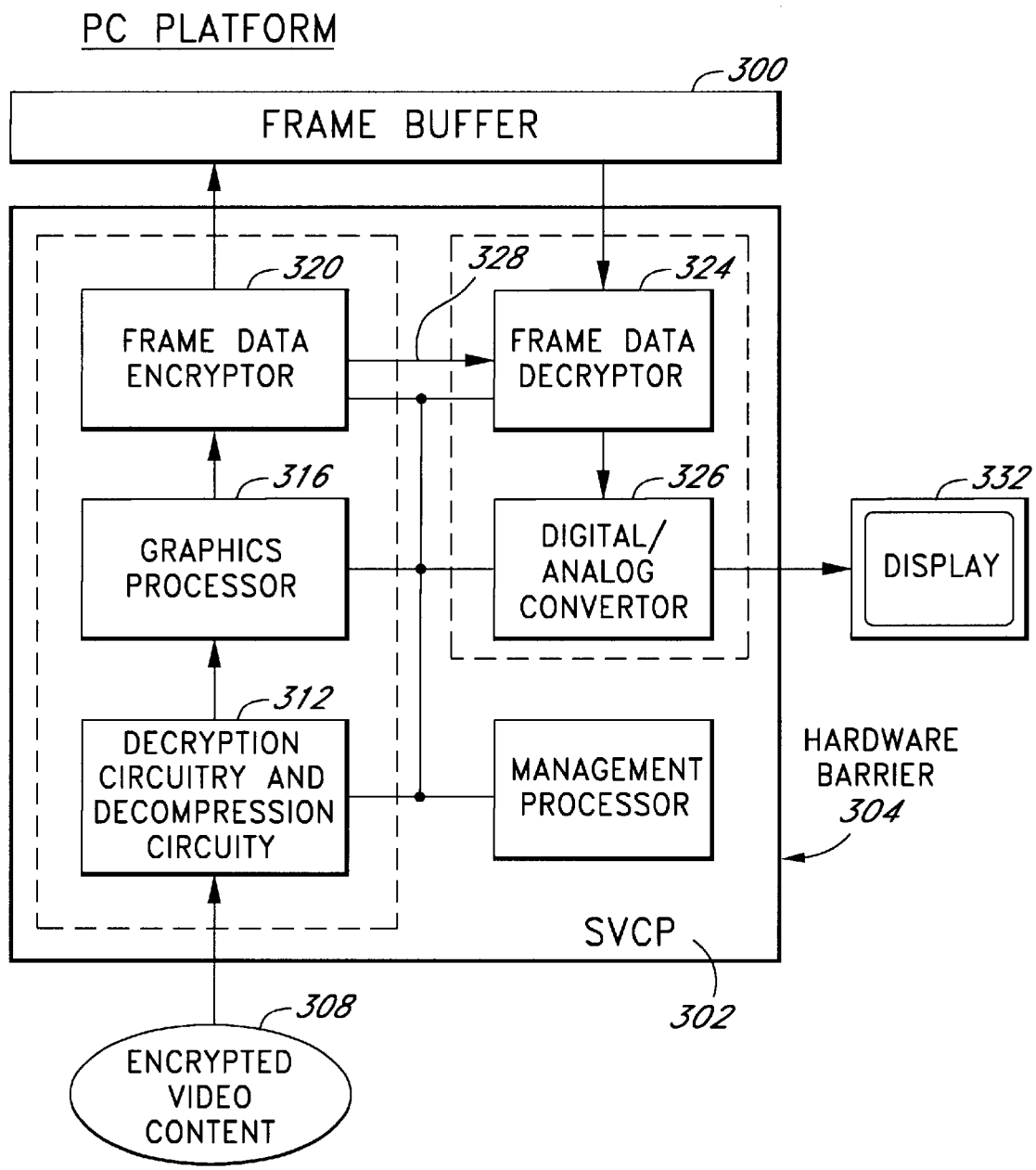
FIG. 3A is a block diagram of a second embodiment of the secure video content processor in which the frame buffer is separate from the content processor electronics.

Often, the memory requirements of the SVCP 200 exceed that which can be conveniently fabricated in a frame buffer 234 on the SVCP 200. Thus, it may be necessary to place the frame buffer outside the hardware barrier 304 surrounding the SVCP 302 as shown in FIG. 3A as secure frame buffer 300. Although, it is contemplated to include the frame buffer 300 within the hardware barrier 304 as shown in FIG. 3B.

The transmission and storage of digital image frames outside the SVCP hardware barrier 304 makes it necessary to encrypt the digital image frames before transmission outside the hardware barrier 304. As in the previously described embodiment, the encrypted video content 308 is decrypted and if necessary, decompressed, by decryption circuitry and any needed decompression circuitry 312, before the graphics are processed by a graphics processor 316. The resulting image frames are encrypted by a frame data encryptor 320 before exiting the hardware barrier 304 for storage in a frame buffer 300. The digital image frames stored in the frame buffer are secure because the digital image frames are encoded.

In one embodiment, the frame data encryptor 320 shares "frame data keys" with a frame data decryptor 324, also located within the SVCP 302. Thus, a communication path 328 is needed between the frame data encryptor 320 and the frame data decryptor 324 to transfer the frame data keys. It is contemplated that these "frame data keys" may be session keys which preferably are periodically changed to reduce the likelihood of a successful cryptographic analytic attack.

When a display device 332 requires a frame of data, the SVCP 302 retrieves the encrypted image frame from the frame buffer 300. Image display electronics including a frame data decryptor 324 which decrypts the digital data and a D/A converter 326, converts the digital image frame data into an analog form appropriate for use with the display device 332.

Figure 4:
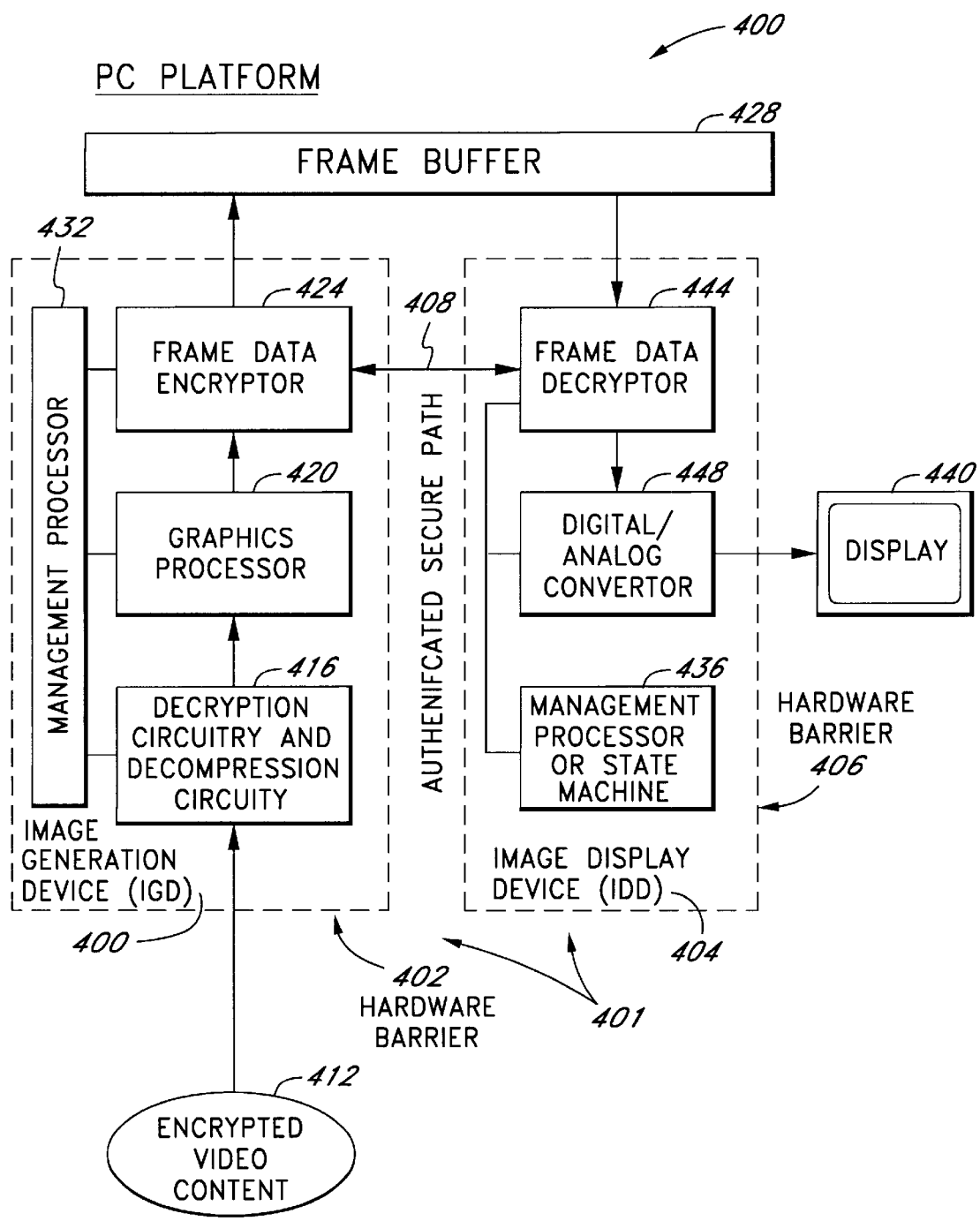
FIG. 4 is a block diagram of a fourth embodiment of the secure video content processor wherein the various graphics processing and digital/analog conversion routines are further separated.

In some designs of the SVCP, it is desirable to further separate high performance digital processing circuitry from circuitry designed to convert the digital signal returning from a frame buffer to an analog signal. Such an embodiment is shown in FIG. 4. In this illustrated embodiment, the main SVCP body 401, is further partitioned into two parts, a first cryptographic unit referred to as an image generation device ("IGD") 400 and a second cryptographic unit referred to as an image display device ("IDD") 404. A hardware barrier 402 such as an integrated circuit package surrounds the IGD 400. A similar hardware barrier 406 surrounds the IDD 404. The taco components are connected by a bidirectional authenticated secure path 408.

The first cryptographic unit or IGD 400 receives incoming encrypted video content 412. Image generation electronics converts the encrypted video content 412 into encrypted data frames. As shown in FIG. 4, these electronic components within the IGD hardware barrier may include but are not limited to the decryption circuitry and decompression circuitry 416, graphics processor 420, frame data encryptor 424 and management processor 432. Within the IGD 400, the encrypted video content is first decrypted and if necessary compressed by decryption circuitry and any needed decompression circuitry 416. The graphics processor 420 processes the decrypted data and generates digital image frame data from the decrypted digital data. A frame data encryptor 424 encrypts the frame data so that it can be stored in a publicly accessible frame buffer 428 without compromising the data. IGD management processor 432 oversees the operations of the IGD 400.

The IDD unit retrieves data from the frame buffer and converts it into a form appropriate for a video monitor. The IDD includes image display electronics which converts the encrypted data frames from the frame buffer into an analog signal for a display device. As shown in FIG. 4, the image display electronics may include but is not limited to the frame data decryption unit 444 and a D/A converter 448.

A second management processor 436 which may be a state machine manages the operation of the IDD 404. As data is needed by the display device 440, the IDD 404 retrieves data frames from the secure frame buffer 428. A frame data decryptor 444 decrypts the retrieved data and a D/A converter 448 converts the retrieved decrypted data into an analog signal appropriate for the display device 440.

An authenticated, bidirectional cryptographically secure path 408 is situated between the IGD 400 and the IDD 404. The IGD 400 ascertains that an appropriate IDD 404 is in place before transmitting the session keys which enable the IDD 404 to decode the data. In a preferred embodiment, the IGD 400 and IDD 404 exchange keys which prevent any other unit besides the specifically designed IGD 400 and IDD 404 from exchanging data. Such authentication may be achieved using session keys between the IGD 400 and the IDD 404. The session keys (keys which match) may be implemented using well-known protocols including the Digital Encryption Standard ("DES"), the International Data Encryption Algorithm ("IDEA") which is a publicly disseminated cryptographic algorithm, and RC2 (a proprietary cryptographic algorithm by RSA Data Security Inc. of Redwood City, Calif.). After authentication, the IGD 400 transmits the session keys for use by the frame data decryptor.

Although the described SVCP in all the described embodiments outputs an analog signal for use by a display device, it is contemplated that the data may be transmitted to the display device in an encrypted digital form for decryption within the display device. One technique of implementing digital transmission to the display device is to incorporate the IDD 404 shown in FIG. 4 inside the display device 440.

Figure 5:
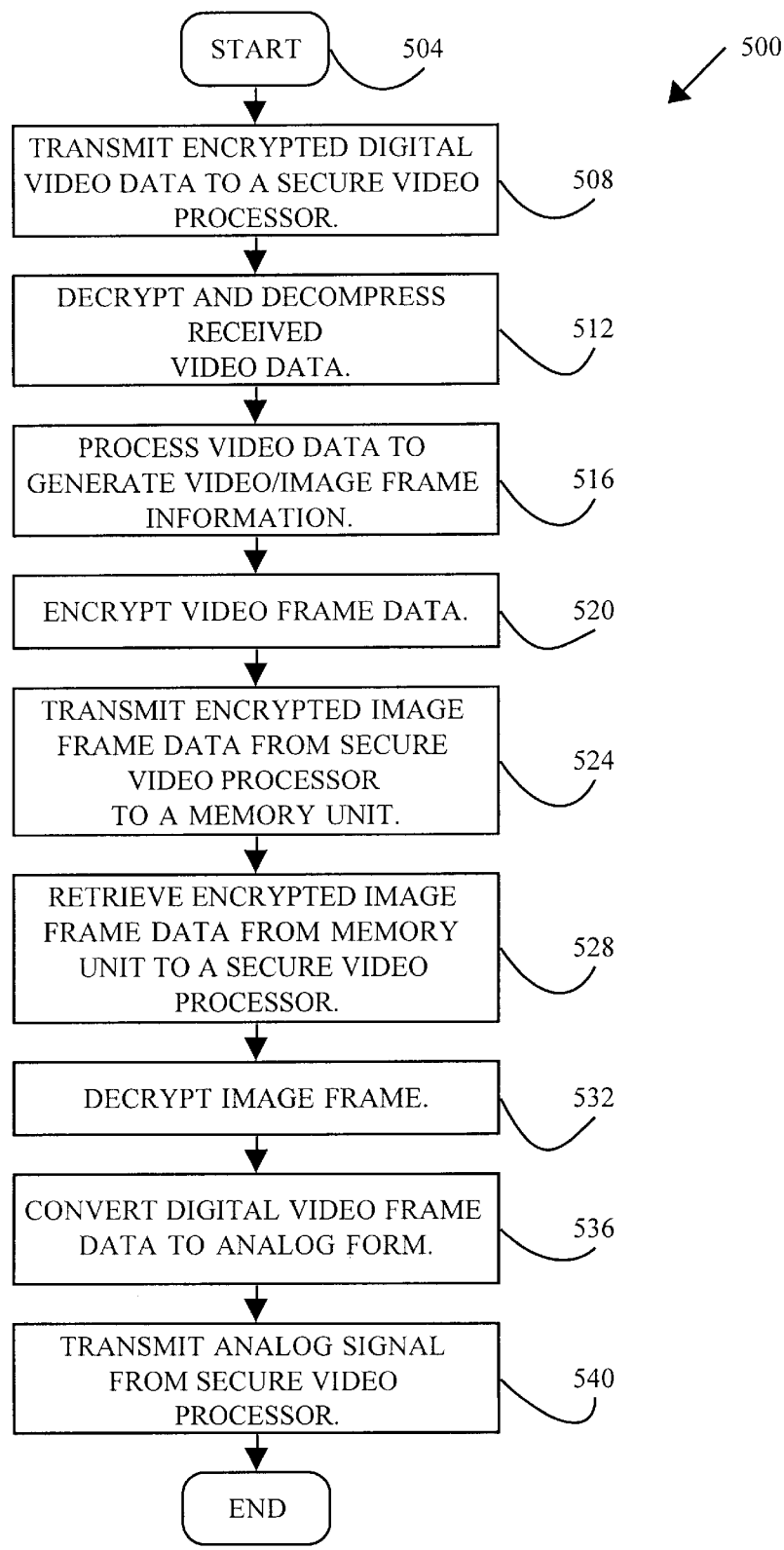
FIG. 5 is a flow chart of the steps executed to securely process encrypted video signals.

FIG. 5 shows a flow chart 500 of the steps executed by the SVCP embodiment of FIG. 3. An external source such as a CD ROM or the DVD transmits an encrypted video signal to the SVCP (step 508) The encrypted video signal is decrypted and possibly decompressed, to put the information in a form for proper processing (step 512). A graphics processor performs the graphics processing (step 516) to generate video or image frames of data.

To protect the image frames of data while it is stored outside the secured perimeter of the SVCP, the data is encrypted (step 520). The encrypted image frames are transmitted to a frame buffer where the image frames are stored (step 524) until needed.

A management processor determines when a display device will require particular frames of data. When a particular frame will soon be needed, the particular frame is retrieved from the frame buffer (step 528). The encrypted image frame is decrypted (step 532), using keys obtained from the encryption circuitry. In other embodiments, the keys will be transmitted on an authenticated secure path.

The decrypted image frames of digital data are then converted to analog form (step 536) before being transmitted from the secure video processor to a display device (step 540). In an alternative embodiment the encrypted frames may be transmitted to the display device and decoded within the display device. One method of processing the encrypted frames within the display device is to install the IDD portion of the SVCP in the display device. Such an embodiment is particularly useful in display devices designed to handle digital input.

An embodiment of the SVCP has been described using an implementation in a PC because PCs are particularly susceptible to software probing. However, it is contemplated that the SVCP may be implemented in other electronic devices, such as television set-top boxes and video game units. The SVCP may also be built into equipment such as DVDs and CD ROM devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A secure video content processor having a hardware barrier, the secure video content processor comprising:
    a first cryptographic unit placed within the hardware barrier, the first cryptographic unit decrypting incoming digital encrypted video information and producing encrypted image frames based on the video information;
    a frame buffer coupled to the first cryptographic unit and placed within the hardware barrier, the frame buffer receiving the encrypted image frames from the first cryptographic unit; and
    a second cryptographic unit coupled to the frame buffer and placed within the hardware barrier on a single chip with the first cryptographic unit, the second cryptographic unit retrieving the encrypted image frames stored in the frame buffer, decrypting the encrypted image frames, and converting the decrypted image frames into an analog signal.

2. The secure video content processor of claim 1, wherein the hardware barrier is in a single semiconductor device package.

3. The secure video content processor of claim 2 wherein the first cryptographic unit sends at least one session key to the second cryptographic unit.

4. The secure video content processor of claim 1, wherein the first cryptographic unit decompresses at least one of a Joint Photographic Experts Group (JPEG) image and a Motion Photographic Experts Group (MPEG) image.

5. The secure video content processor of claim 1, wherein electronics of the first cryptographic unit are formed on a single silicon chip.

6. The secure video content processor of claim 5 wherein electronics of the second cryptographic unit are formed on a second silicon chip.

7. The system of claim 5, wherein electronics of the cryptographic unit are formed on a single silicon chip.

8. The secure video content processor of claim 1, wherein the first cryptographic unit decompresses the incoming digital encrypted video information.

9. A secure video content processor for securely processing encrypted digital video information, the secure video content processor encased in a single semiconductor package, the secure video content processor comprising:
    a decryption unit which receives the encrypted digital video information from a source outside of the single semiconductor package, the decryption unit decodes the encrypted digital video information to generate decrypted digital data;
    a processing unit coupled to the decryption unit, the processing unit configured to generate digital image frames from the decrypted digital data;
    a frame memory coupled to the processing unit, the frame memory retains the digital image frames generated by the processing unit; and
    a digital-to-analog converter coupled to the frame memory for converting the digital image frames to an analog signal, and transmitting the analog signal representing the image frames to devices located outside the single semiconductor package.

10. The secure video content processor of claim 9 wherein the single semiconductor package is a ceramic package.

11. The secure video content processor of claim 9 wherein processor processes at least one of a JPEG image and a MPEG image.

12. A system for processing video data, the system comprising:
    a host processor;
    a cryptographic unit coupled to the host processor, the cryptographic unit decrypts and processes incoming encrypted digital video data to generate frame data, the cryptographic unit encased in a semiconductor package;
    a frame buffer which stores the frame data, the frame buffer encased in the semiconductor package;
    a digital to analog converter, the digital to analog converter designed to convert decrypted frame data from the frame buffer into an analog signal, the digital to analog converter encased in the semiconductor package; and
    a display device designed to generate a viewable image from the analog signal.

13. The system of claim 12 further comprising a source of the encrypted digital video data.

14. The system of claim 13 further comprising a memory unit coupled to the host processor.

15. A secure video content processor comprising:
    a first cryptographic unit for decrypting incoming digital encrypted video information and to produce encrypted image frames based on the video information;
    a frame buffer coupled to the first cryptographic unit, the frame buffer for receiving the encrypted image frames from the first cryptographic unit;
    a second cryptographic unit coupled to the frame buffer and in communication with the first cryptographic unit to exchange a key, the second cryptographic unit for receiving the encrypted image frames stored in the fame buffer, decrypted the encrypted image frames, and converting the decrypted image frames into an analog signal; and a hardware barrier containing the first cryptographic unit, the frame buffer and the second cryptographic unit encapsulated in a single semiconductor device package.

16. The secure video content processor of claim 15 wherein the key includes at least one session key transferred from the first cryptographic unit to the second cryptographic unit.

17. The secure video content processor of claim 15, wherein electronics of the first cryptographic unit are formed on a single silicon chip.

18. The secure video content processor of claim 17, wherein electronics of the second cryptographic unit are formed on a second silicon chip.

19. The secure video content processor of claim 15, wherein the second cryptographic unit includes a digital to analog converter.

20. A system for processing video data, the system comprising:

a host processor;

a cryptographic unit coupled to the host processor, the cryptographic unit decrypts and processes incoming encrypted digital video data to generate frame data, the cryptographic unit encased in a semiconductor package;

a frame buffer which stores the frame data, the frame buffer encased in the semiconductor package; and a digital to analog converter designed to convert decrypted frame data from the frame buffer into an analog signal, the digital to analog converter encased in the semiconductor package.

* * * * *

UNITED STATES PATENT AND TRADEMARK OFFICE
CERTIFICATE OF CORRECTION

PATENT NO.  : 6,064,739
DATED       : May 16, 2000
INVENTOR(S) : Davis

It is certified that error appears in the above-identified patent and that said Letters Patent is hereby corrected as shown below:

Column 5,
Line 13, delete "16" and insert -- 216 --.

Column 6,
Line 1, delete "taco" and insert -- two --.

Signed and Sealed this

Sixth Day of November, 2001

Attest:

*Nicholas P. Godici*

NICHOLAS P. GODICI
*Attesting Officer*      *Acting Director of the United States Patent and Trademark Office*